UNITED STATES PATENT OFFICE.

JAMES L. BROWN, OF INDIANHEAD, MARYLAND, AND DAVID P. MOORE, OF WASHINGTON, DISTRICT OF COLUMBIA, ASSIGNORS TO MANUEL ANTONIO GOMEZ HIMALAYA, OF ARCOS-DE-VAL-DE-VEZ, PORTUGAL.

SMOKELESS POWDER.

No. 868,158.        Specification of Letters Patent.        Patented Oct. 15, 1907.

Application filed August 10, 1903. Serial No. 169,030.

*To all whom it may concern:*

Be it known that we, JAMES L. BROWN and DAVID P. MOORE, both citizens of the United States, BROWN residing at Indianhead, in the county of Charles and State of Maryland, and DAVID P. MOORE residing at Washington, in the District of Columbia, have invented certain new and useful Improvements in Smokeless Powder, of which the following is a specification.

Our present invention relates to improvements in smokeless powder and the method of compounding the same.

The main object of the invention is to provide a powder which is easy, safe and cheap of manufacture, which is non-hygroscopic, which will not deteriorate or suffer any chemical change with age, and which is not liable to danger of explosion by ordinary friction or to become deteriorated and dangerous as a result of spontaneous fermentation, thus presenting a safe and at the same time a powerful explosive either for blasting or sporting purposes.

The powder consists of the following ingredients, which are compounded substantially according to the following method: A chlorate, preferably chlorate of potassium, which constitutes the explosive base or oxygen-furnishing ingredient, is mixed with the necessary quantity of vegetable oil, preferably a siccative oil, as linseed oil, the oil preferably having first been boiled; and the two ingredients are thoroughly compounded together, thereby giving each individual crystal of the chlorate a sealing, cushioning and waterproofing layer of oil. These two ingredients are combined with a substantially pure carbohydrate, substantially free of proteids and other bodies which would facilitate fermentation or souring preferably starch, said carbohydrate being obtained from any cereal or vegetable, such as corn or potatoes. Instead of starch, we can use other substantially pure carbohydrates, such as cellulose practically pure as it is found, for instance, in cotton fiber and paper fiber derived from vegetable sources. Whatever carbohydrate is used must be substantially free of proteids and other bodies which would facilitate its fermentation or souring. To this mixture we add a sufficient amount of water to make a mass of about the consistency of putty. These ingredients, when thus combined, are thoroughly mixed, and afterwards the compound is dried, and reduced to granular form of the desired size. These ingredients are mixed in about the following proportions:—Chlorate about 60%, starch, or its equivalent, about 30%, oil about 10%. If desired, a small amount of a coloring matter may be added.

We do not limit ourselves to the use of starch, it being found that the same results are obtained from any practically pure, unfermenting carbohydrate obtained from vegetable sources. Practically pure starch or cellulose appear to be, in general, the two alternative forms of this carbohydrate ingredient. Both are non-hygroscopic in the sense that neither will take up enough moisture from the air to appear moist as the vegetable materials from which they are derived frequently will.

This powder, by reason of each particle of starch, or equivalent combustible, and chlorate being covered and mixed with boiled linseed oil, is safe, does not absorb the moisture of the air, and does not deteriorate on account of chemical changes to which other powders are subject after a certain lapse of time. It is especially adapted for sporting and blasting purposes by reason of the safety with which it can be handled.

We are aware of a smokeless powder which consists of chlorate of potash, wheat flour, and linseed oil; but the great advantage obtained by employing practically pure starch or cellulose instead of a cereal flour makes our invention an improvement on said powder. It is well known that any cereal flour, such as wheat flour, will deteriorate with age, becoming moist and sour, while on the contrary starch or cellulose, substantially pure, may be kept in a dry place indefinitely; therefore, by substituting these substances for flour and by associating a vegetable oil therewith, we produce a powder that will not deteriorate. In the presence of the potassium of the potassium chlorate, flour, which already contains nitrogen and phosphates, becomes an especially favorable nidus for fermentative organisms, while starch, containing neither nitrogen nor phosphates, does not offer this disadvantage in admixture with potassium chlorate. Further, practically pure starch and cellulose burn more readily than flour, and the powder compounded with either of them is easier to ignite than a powder compounded with flour. As linseed oil and similar siccative oils dry solid after a time, they do not interfere with the free-running qualities of the finished powder.

What is claimed as new is:

1. A smokeless powder comprising a powdered chlorate having its particles individually covered and sealed by a layer of siccative oil in admixture with a substantially pure carbohydrate, substantially free from proteid and hygroscopic matter, said powder being free-running, non-hygroscopic, non-fermenting and keeping unchanged.

2. A smokeless powder comprising a powdered chlorate having its particles individually covered and sealed by a layer of linseed oil in admixture with a substantially pure carbohydrate, substantially free from proteid and hygroscopic matter, said powder being free-running, non-hygroscopic, non-fermenting and keeping unchanged.

3. A smokeless powder comprising a powdered chlorate of potassium having its particles individually covered and sealed by a layer of linseed oil in admixture with substantially pure starch, substantially free from proteid and hygroscopic matter, said powder being free-running, non-hygroscopic, non-fermenting and keeping unchanged.

4. A smokeless powder comprising a powdered chlorate having its particles individually covered and sealed by a cushioning and water-proofing layer of a soft, skin-forming combustible material in admixture with a substantially pure carbohydrate, substantially free from proteid and hygroscopic matter, said powder being free-running, non-hygroscopic, non-fermenting and keeping unchanged.

In testimony whereof we affix our signatures in presence of two witnesses.

JAMES L. BROWN.
DAVID P. MOORE.

Witnesses:
JAMES M. MANGHUM,
JENNIE M. WRIGHT.